Figure 1:
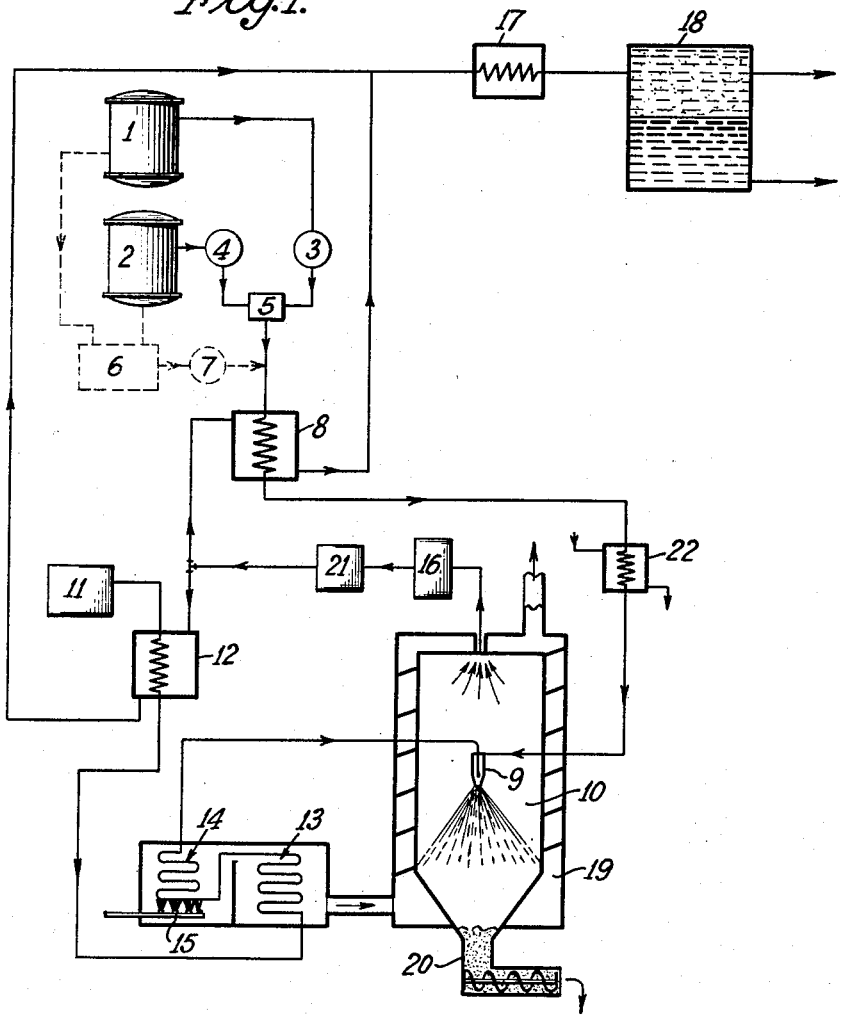

INVENTORS
ROBERT BANGS COLGATE
ROBERT LOUIS BRANDT
HAROLD DWAINE ALLEN
BY
Trenton Meredith
ATTORNEY Patented Apr. 13, 1943

2,316,670

UNITED STATES PATENT OFFICE 2,316,670

FLASH DISTILLATION OF ORGANIC SULPHONATE SOLUTIONS

Robert Bangs Colgate, Huntington, and Robert Louis Brandt, New York, N. Y., and Harold Dwaine Allen, Glen Rock, N. J., assignors to Colgate-Palmolive-Peet Company, Jersey City, N. J., a corporation of Delaware Application March 28, 1940, Serial No. 326,394

6 Claims. (Cl. 260—504)

The present invention relates to a process of neutralizing, purifying or concentrating sulphonated organic materials, and more particularly to a flash distillation process of preparing substantially dry petroleum sulphonate salts, substantially free from non-sulphonated material.

In the production of inexpensive sulphonate detergents, it has long been desired to employ petroleum as the raw material. The sulphonate petroleum products, when purified, are in many cases excellent detergents as such but a real difficulty encountered in their commercial manufacture is the production of these materials free from unreacted oil. The unreacted oil materially impairs the detergent efficiency of the sulphonate products and often causes stickiness and staining of the material being washed. Various solvent purification methods have been suggested in the prior art. However, because of the extensive and highly costly apparatus involved and the several technical difficulties occasioned by emulsions, corrosion, etc., and the explosion and toxic hazards, such methods are not to be desired. Another difficulty encountered is in the drying of these petroleum sulphonates, because concentration of the solution often results in foaming to an uncontrollable degree as well as decomposition of the dried non-fusible salt product.

The present invention is directed to an economical process for removing unsaponifiable or non-sulphonated material from organic sulphonates with a minimum of handling and without decomposition of the sulphonate product. It also provides a method of concentrating and drying organic sulphonate salts to a light-colored, stable powder or bead substantially free from unsaponified material by a process requiring only simple inexpensive apparatus. The process also provides a method for preparing detergent sulphonate salts, either dry or of a definite water content, in a continuous manner.

The process of this invention generally comprises the preparation of a hot solution of an organic sulphonate salt, preferably in contact with a gas such as steam, and reducing the pressure on the solution (flashing) while maintaining the temperature above the boiling point of the solvent at the reduced pressure in order to vaporize solvent and non-sulphonated material therefrom. By operating in this manner, unsaponifiable material is removed at a temperature appreciably lower than the normal boiling point thereof. That this process will operate is surprising, when it is considered that the distillation of such a solution to dryness, even with a current of steam, is not possible, since many of the organic sulphonate salts will not fuse at normal operating temperatures and many decompose at raised temperatures.

The purification of petroleum sulphonates is particularly effective by the method of the present invention. For example, a typical petroleum sulphonation mixture comprising mainly sulphuric acid, petroleum sulphonic acids, and non-sulphonated petroleum is diluted with sufficient water to cause an immiscible layer of sulphuric acid to separate from the mixture. This sulphuric acid layer is withdrawn. The petroleum sulphonic acid is further diluted with water, about an equal volume, whereby about one-half of the unsaponifiable organic material floats to the surface of the aqueous sulphonic acid solution. The latter is separated. The aqueous acid solution is then neutralized, which step may be conducted in a batch procedure or by a continuous process. The acid may be added to the caustic, the caustic added to the acid, or streams of the reactants may be brought into confluence directly or in the presence of previously reacted material. The alkali may be employed directly or as a concentrated solution. The hot neutralized solution is then further raised in temperature and, in contact with gas such as steam generated therein or added thereto, is flashed into a chamber held at a temperature above the boiling point of water at the pressure therein whereby an appreciable amount of water is vaporized, taking along with it highboiling non-sulphonated material. The flash chamber may be operated at atmospheric, elevated, or reduced pressure. The salt solution may be heated to such a point that it will be partially vaporized and will contain sufficient heat to volatilize all the water and unsaponifiable material in the mixture when flashed into the chamber at a lower pressure. The energy necessary for flashing is obtained by control of the pressure and the degree of vaporization of the solvent, as well as the temperature of the sulphonate salt solution and/or by injecting the solution into the flash chamber while contacting it with highly superheated steam and/or other inert gases such as kerosene vapor, carbon dioxide, flue gases, etc., at the moment of entrance to the flash chamber.

The latter procedure is far superior to those methods omitting the use of superheated steam in the above manner, in that the solution is not subjected for any substantial period of time to the exceptionally high temperature that is required to volatilize the higher boiling non-sulphonated material with the water under economical dilution, nor is the solution excessively diluted, which procedure is necessary in order to provide a high enough steam to oil ratio to volatilize substantially all of the unsaponifiable matter at lower flashing temperatures. The superheated steam should be at a substantially higher temperature than that of the solution and the contact with the solution should be made at extremely high velocity and for a minimum time period before introduction into the flash chamber. The contacting of superheated steam and salt solution may advantageously be accomplished in a specially designed nozzle that permits intimate but only extremely brief direct contact and as little indirect contact as possible, before emission into the flash zone. In this manner, it is possible to supply to the sulphonate solution at the critical point sufficient heat at an optimum temperature and velocity to volatilize the non-sulphonated organic matter and water without decomposing the product and without using uneconomically large quantities of water or steam, such as are required by conventional steam distillation methods. Plugging of the pipes and nozzles and decomposition of the products are avoided, since the solution itself is not unduly or excessively heated before its introduction into the nozzle where it attains high velocity and adequate heat momentarily before discharge into the flash chamber.

A detailed description of the operation of one embodiment of the present process with reference to the attached drawings permits a better understanding of the principles of the present invention.

The proportioning pumps 3 and 4 force the aqueous or other solution of sulphonic acids, e. g., an aqueous solution of a white oil refinery sludge, from tank 1, and the reagent, e. g., a 37° Bé. caustic soda solution from tank 2, to flow under pressure into the mixer or homogenizer 5. Although the two pumps 3 and 4 are employed in the preferred apparatus shown, the materials could be mixed in proper proportion in the tank 6 by installing a mechanical mixer therein and the mixture pumped by the pump 7. In this case, a pump and the homogenizer could then be omitted.

The homogenizer or mixer 5 brings together a stream of the acid sulphonate solution and a stream of reagent, thereby dispersing the reagent in the sulphonic acid solution, either by mechanical or jet mixers.

The mixed solutions are then pumped through solution heater 8. This heater may be a tubular type or a coil externally heated, either directly by combustion products from the boiler and steam superheater, by immersion in steam or hot oil, by electrical means, or thermal economy may be obtained by employing hot vapors issuing from the flash chamber. In the operation set forth in the attached flow sheet, Figure 1, the latter method of heating is employed. The heating and flow are preferably automatically controlled. The solution may be further raised in temperature by any suitable means, such as a steam heated tubular type apparatus 22. The sulphonate salt solution will be raised to a temperature between about 25° and 200° C., e. g., at 121° C. (250° F.) at about 30 lbs. per square inch absolute, the temperature of saturated steam at the pressure under which it is held because of the friction or back pressure of the system. The proportion of steam can vary from a trace to a quantity corresponding to almost all of the water in the solution. The steam generated causes an increase in velocity of flow of the solution. By control of the rate of feed, temperature, and pressure, the quantity of steam formed from the solution may be held at a constant value, preferably between about 50% to 90%. Too great a proportion of water of solution evaporated at this point causes very uneven operation with plugging of tubes, decomposition of products and/or generally unsatisfactory results.

The aqueous sulphonate salt solution is then introduced into the spray nozzle 9. At the same time water from tank 11 is continuously pumped in regulated quantities through pre-heater 12 and boiler 13 and from this point led into steam superheater 14. The steam is superheated to any desired temperature, preferably between 260° and 700° C., e. g., at 593° C. (1100° F.), in the superheater 14 by means of gas burner 15 or any other suitable means. It is then led into spray nozzle 9. In spray nozzle 9 the aqueous sulphonate salt solution is momentarily but intimately contacted with the highly superheated steam and the mixture sprayed through nozzle 9 at an exceptionally high velocity and at the required pressure drop into flash chamber 10 maintained at a temperature between about 150° and 300° C., e. g., about 205° C. (401° F.), and atmospheric pressure. At this point substantially all of the water and unsaponified material is volatilized. The sulphonate salt, usually as small dry particles, drops to the bottom of the spray chamber 10 from which it may be continuously withdrawn through the opening 20 by suitable means, such as a continuous screw, vibrating device or the like. It is important to note that with many compounds that tend to be unstable at elevated temperatures, the dried product removed from the apparatus should be kept out of contact with the atmosphere until cooled (say 130° C.) else darkening of the product may occur. If desired, steam may be blown through the flash chamber or a partial vacuum established therein by suitable operation of an evacuating system but, as a matter of convenience and economy, it is usually better to operate at substantially atmospheric pressure. In the event it is desired to operate chamber 10 under sub-atmospheric pressure, the removing means at 20 should have a suitable sealing device. In the device illustrated the volatilized hydrocarbon oil or other unsaponifiable organic matter and steam, at atmospheric pressure, pass out of the upper portions of the flash chamber 10 and through dust separator 16 in which any fine particles of sulphonate product carried by the steam and oil vapors are removed. However, a concurrent apparatus may be employed with a suitable arrangement for separating the solids from the vapors, such as a cyclone, etc. The dust-free vapors are compressed in a thermal compressor 21 and are then led through preheaters 8 and 12 into the cooler or total condenser 17. The total condensate is then settled in tank 18 to recover a supernatant layer of unsaponifiable material and a lower aqueous layer.

By inserting the thermal compressor 21, such as a steam-injector or a mechanical blower or compressor, the greater part of the heat supplied to the system is salvaged; the sensible heat and the latent heat of condensation of the commingled vapors give up their heat energy to the incoming sulphonate solution and water. The entire flash chamber is kept at the proper temperature (radiation losses prevented) by means of jacket 19 which completely encloses flash chamber 10. The hot flue gases or a portion thereof issuing from steam superheater 14 and/or from water boiler 13 are passed into this jacket and are discharged at some point near the top of the apparatus. Should local conditions warrant, an economizer may be added at this point to salvage more heat. The nozzle 9 in conjunction with the pumps 3 and 4 control to a great extent the pressure and rate of flow of the sulphonate salt solution. Obviously, the temperature of operation of the heaters and of the steam superheater play a part. The total quantity of steam preferably should be greater than about 100 parts by weight of total steam to one part by weight of unsaponifiable organic material, although higher or lower ratios may be employed, but these ratios depend on the quantity, volatility and boiling ranges of the unsaponifiable material. The drop in pressure in the nozzle 9 depends upon the rate of flow of the sulphonate salt solution and the steam therethrough. This rate of flow in turn depends upon the pressure and rate of flow of sulphonate salt solution and superheated steam supplied by the pumps as well as the pressure generated by the various heating elements. The nozzle 9 is detachable from steam and solution pipes so that nozzles of varying sizes may be employed. It is essential that the construction of the spray nozzle and its functions be properly understood. The object of the system is to contact directly the sulphonate solution with highly superheated steam for as short a time interval as is consistent with virtually complete equilibrium contact of the steam with the hydrocarbon oil. This is accomplished by means of the nozzle diagrammatically shown. Note that the steam issuing from the constricted orifice 23 impinges upon the orifice 24 of the spray nozzle at extremely high velocity just before entering the spray chamber proper. The steam is given a whirling motion inside the jet by a spiral. The solution is led through the annular passage where is attains an enormous velocity. This will result in an almost complete atomization of the solution, thus rendering maximum contact between steam and oil. At the same time the solution absorbs the required heat in an extremely short time interval and so prevents decomposition. The short path of the flow and high velocity prevents any possibility of clogging of orifices 23 and 24. It is also very important that practically no transfer of heat between the steam and the solution occurs before actual physical contact of the two. That is, the pipe or jet conducting the steam should have as little contact as is possible with the sulphonate solution. If the area of contact is not reduced to a minimum, this very high temperature steam (in the neighborhood of 1000° F.) will heat the solution causing a film of solids to bake on the walls of the pipe and so lead to eventual plugging, and at the same time carbonization of the sulphonate product.

In practice the proportion of superheated steam introduced into the nozzle 9 can be regulated so that a dry product, a hydrated product, or a solution thereof, is obtained. The product is preferably in a more or less finely divided condition which permits its transformation into flake or other physical forms, for example, by passing between a pair of properly spaced rolls, or by pressing into cakes, with or without addition agents.

It is often desired to prepare the sulphonate salt product free of inorganic salts, such as sodium sulphate, sodium chloride, or the like. This may be accomplished by dialysis, and/or by extraction of the aqueous sulphonate solutions with solvents, such as ethyl alcohol, butyl alcohol and the like. It is also possible to change the cation of the sulphonate salt in such a solvent solution by cation exchange with an inorganic salt in an immiscible aqueous solution, as described in U. S. Patent 2,187,144. If desired, the solvent solution may then be treated by the present process to obtain a dry, oil-free product and to recover the solvent.

If it is desired to add other agents to the sulphonate salt product, they can be uniformly mixed with the solution thereof before, during, or after its preparation, and they will be uniformly distributed in the final product. It is also possible to arrange the apparatus so that one or more nozzles are employed to spray the same or different solutions, thereby forming particles of uniform composition, heterogeneous mixtures and/or coated particles. In the case of the coated particles, the product may be controlled as to solubility, color, odor, density, stability and/or the like by suitable selection of the coating.

*Example I*

Figure 2:
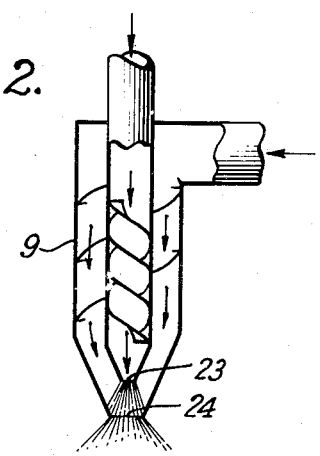

An aqueous solution of a mineral oil extract sulphonic acid, which has been sulphonated while dissolved in liquid sulphur dioxide and from which sulphur dioxide, some sulphuric acid and some unsulphonated oil has been removed by the method described in the Brandt application Serial No. 239,553 filed November 8, 1938, which issued as U. S. Patent No. 2,285,390, is neutralized with caustic soda. The neutralized solution containing 27.8% salts and 5.4% non-sulphonated oil is pumped through a steam heated tubular heater of about 30 feet of steel tubes having an internal diameter of 0.364 inch wherein the temperature of the solution is raised to about 120° C. (250° F.). The absolute pressure at the heater inlet is raised to about 30 lbs. per square inch. The absolute pressure at the heater outlet is about 20 lbs. per square inch. About 75% to 85% of the water in the solution is vaporized in this heating. In a separately fired furnace, steam is superheated to about 480° C. (900° F.), at an absolute pressure of about 140 lbs. per square inch. The partially vaporized sulphonate solution and highly superheated steam in the proportion of about 148 kilograms of solution to 1,000 kilograms of superheated steam are separately piped into the flash chamber where they meet in a nozzle such as is depicted in Figure 2. The superheated steam is momentarily intimately commingled with the solution, thereby sweeping the solution from the nozzle into the flash chamber at a high velocity and supplying enough heat at an optimum temperature to vaporize substantially all the water and all the non-saponifiable organic material held in suspension by the sulphonate solution. The flash chamber is held at atmospheric pressure and at a temperature of about 200° C. (392° F.), which is below the decomposition temperature of the sulphonate salt in the absence of air. The product is an odorless, dry, oil-free, granular mixture of mineral oil extract sulphonate salt and sodium sulphate, which falls to the bottom and is removed and cooled out of contact with air until the temperature is below about 110° C. The vapors of water and non-sulphonated oil are removed from the top of the chamber and condensed to recover about 93% of the unreacted oil, which oil has a boiling range between about 232° and 510° C. (450° and 950° F.).

*Example II*

About 100 kilograms of a neutralized aqueous solution of 18% sodium salts of a mineral oil extract sulphonic acid, 12% sodium sulphate and 4% unreacted oil are admixed with 200 kilograms of an aqueous solution of 18% crude tall oil soap freshly separated from black liquor and 2% sodium carbonate. The mixed solutions are heated in an apparatus similar to that described in Example I to a temperature of about 130° C. (265° F.) and at about 10 lbs. per square inch above atmospheric pressure. Approximately 80% to 85% of the water in the solution is vaporized in the tubes. The mixed solution along with steam superheated to a temperature of about 510° C. (950° F.) at a pressure of 130 lbs. per square inch absolute is introduced by means of a nozzle as described hereinbefore into a flash chamber held at about 205° C. (401° F.). The ratio of solution to steam is about 100 parts by weight of solution to 1,000 parts by weight of superheated steam. The cooled product is an odorless, dry, alkaline detergent product substantially free from unsulphonated oil, phytosterols, phenols and similar materials. These latter materials are condensed with the steam and recovered.

It is important to note that the system may be usefully employed in the preparation of crude oil-free sulphonates that may be prepared from conventional petroleum refinery acid sludges. These sludges are ordinarily obtained from the kerosene, white oil and lubricating refinery processes. For example, the acid sludge resulting from kerosene treatment may be run into a tank and permitted to settle for some time when an oily layer will separate. The sludge layer is separated and neutralized with caustic soda, soda ash, ammonia, etc., when a solution of salts of sulphuric acid and sulphonates with kerosene in dispersed form is obtained. This solution may be flash-dried with the production of a dry substantially oil-free material. Similarly, in the preparation of white oil, it is the usual practice to drastically treat the oil with strong or fuming sulphuric acid in several batch dumps. The acid sludge may be neutralized in the usual manner when an aqueous solution of the salts containing oil is obtained. This solution may be handled according to this invention.

Since there are almost innumerable ways of handling refinery acid solutions, such as water dilution to remove part of the acid and part of the emulsified oil, the above examples are not limiting but merely descriptive. At times the refinery finds it desirable to prepare the so-called mahogany acids or their salts. These mahogany acids are organic compounds of unknown or of very vaguely understood constitution and are distinguished by virtue of the fact that they are oil soluble. Oil solutions of such compounds may be handled in a highly satisfactory manner by this invention.

The organic sulphonic acids which may be treated by the present process also include sulphonated mineral oil, conventional mineral oil refinery sludges, sulphonated mineral oil extracts, e. g., the products described in U. S. Patents Nos. 2,149,661, 2,149,662 and 2,179,174; sulphonated fatty acids and oils, such as sulphonated castor oil, sulpho-ricinoleic acid, sulphonated olive oil, sulpho-oleic acid; long-chain aliphatic sulphonates and sulphates such as cetyl sulphuric acid, lauryl acid sulphate, tetradecane hydroxy sulphonic acid, 1, 2; aliphatic ether and ester sulphonates such as dodecyl ether of hydroxyl ethyl sulphonic acid, cetyl ether of glyceryl sulphonic acid, tallow monoglyceride monosulphate and coconut oil fatty acid monoesters of beta methyl glycerine sulphonic acid; sulphonates prepared by treatment of organic materials with sulphur dioxide and chlorine and hydrolysis of the product such as those mentioned in U. S. application Serial No. 302,538 filed November 2, 1939; sulphonates prepared by treatment of organic materials with sulphuryl chloride and an activating agent and hydrolysis of the product such as those mentioned in U. S. application Serial No. 310,214 filed December 20, 1939, fatty acid amides of amino alkyl sulphonic acids, such as lauric acid amide of taurine and tall oil acid amide of amino glyceryl sulphonate; sulphonic acids of naphthenes and naphthenic acids; lignin sulphonic acids; aromatic and alkylated aromatic sulphonic acids, such as those mentioned in U. S. application Serial No. 259,792 filed March 4, 1939, now U. S. Patent No. 2,244,512, naphthalene sulphonic acid, lauryl benzene sulphonic acid and stearyl naphthalene sulphonic acid; and innumerable other organic sulphonic acid derivatives or mixtures thereof.

Among the bases that may be employed for neutralizing the sulphonic acids with or without the presence of free sulphuric acid and other saponifiable materials are soda ash, caustic soda, potash, caustic potash, ammonia, lime, limestone, dolomite, methyl amines, ethyl amines, butyl amine, mono-, di-, or tri-ethanol amines, mono-, di-, or tri-glycerol amines, pyridine, aniline, piperidine and the like. Other salts which may be formed include those of magnesium, aluminum, lithium, mercury, copper, zinc, iron and various mixtures of any of the foregoing organic and inorganic salts. When preparing salts of metals which form insoluble inorganic sulphates, it will generally be desirable to filter the solutions before spray drying the products.

The sulphonic acids may be neutralized along with the other saponifiable materials such as fatty oils, fatty acids, waxes, resin acids, cyclo aliphatic acids and other organic and inorganic acids. Among the specific saponifiable materials which may be used are tall oil, tallow, olive oil, palm oil, coconut oil, linseed oil, Chinawood oil, castor oil, garbage grease, wool fat, cottonseed oil, cottonseed foots, whale oil, fish oil, babassu oil, peanut oil, spermaceti, and the various individual fatty acids in these materials, crude naphthenic acids, rosin, sulphuric acid, and various mixtures of any of these acids, waxes, oils and resins.

Among the materials which may be admixed with the organic sulphonic acids or their sulphonates by mixing with the sulphonate solution before flashing, by simultaneously flashing a second solution thereof and/or by mixing the final products therewith, are fatty acid soaps, resin acid soaps, naphthenic and alkylated naphthenic acid soaps; alkaline soap builders, water-soluble, water-softening phosphorus acid compounds, and other salts including sodium carbonate, sodium silicates, trisodium phosphate, borax, sodium tetraphosphate, sodium bicarbonate, sodium sulphate, sodium chloride, sodium acetate, sodium hypochlorite, sodium thiosulphate, sodium perborate, sodium tartrate, sodium citrate and sodium oxalate and the corresponding ammonium, substituted ammonium and potassium salts thereof; insecticidal, germicidal, styptic and medicinal agents including aluminum chloride, mercuric chloride and various copper and lead salts; coloring agents, abrasives, fillers, and water dispersible gums including dyes, lakes, pigments, silica, kieselguhr, silica gel, feldspar, precipitated chalk, pumice, infusorial earth, bentonite, talc, starch, Irish moss, sugar, methyl cellulose, agar, gum tragacanth, gum arabic, polyvinyl alcohol; liquids such as ethyl alcohol, glycerol, cyclohexanol, naphtha, benzene, kerosene, turpentine, pine oil, decalin and tetralin and the like. The type of addition agent will depend on the ultimate use of the new composition.

We claim:

1. The process of purifying organic sulphonates which comprises preheating a solution of an organic sulphonate salt containing nonsulphonated organic material to partially vaporize said solution, directly contacting the partially vaporized solution with steam at a higher temperature than that of the solution, and then substantially immediately rapidly reducing the pressure on the solution whereby solvent and non-sulphonated organic material in the solution are volatilized.

2. The process of purifying organic sulphonates which comprises directly contacting an aqueous solution of an organic sulphonate salt containing non-sulphonated organic material with a substantial quantity of superheated steam at a considerably higher temperature than than of the solution, and then substantially immediately rapidly reducing the pressure of the solution to a considerably lower pressure whereby water and non-sulphonated organic material in the solution are volatilized.

3. The process of purifying organic sulphonates which comprises preheating an aqueous solution of an organic sulphonate salt having at least six carbon atoms and containing non-sulphonated organic material to partially vaporize water in said solution at an elevated pressure, directly contacting the partially vaporized aqueous solution with superheated steam at a higher temperature than that of the aqueous solution, and then substantially immediately rapidly reducing the pressure on the aqueous solution to a considerably lower pressure while maintaining the temperature above the boiling point of water at the operating conditions whereby water and non-sulphonated organic material in the solution are volatilized.

4. The process of purifying organic sulphonates which comprises reacting an aqueous solution of alkali with an organic sulphonic acid material having at least six carbon atoms and containing non-sulphonated organic material to yield an aqueous organic sulphonate salt solution, preheating the organic sulphonate salt solution at an elevated pressure, directly contacting the heated aqueous solution with superheated steam of a temperature considerably higher than that of the preheated aqueous solution, and then substantially immediately rapidly reducing the pressure on the aqueous solution to a considerably lower level whereby water and non-sulphonated organic material in the solution are volatilized.

5. A continuous process of purifying organic sulphonates which comprises reacting an aqueous alkali solution with an organic sulphonic acid material having at least six carbon atoms and containing non-sulphonated organic material to yield an aqueous organic sulphonate solution, and preheating the organic sulphonate salt solution to partially volatilize water in said solution at an elevated pressure, directly contacting the partially vaporized aqueous solution with superheated steam at a considerably higher temperature than that of the solution, substantially immediately thereafter rapidly and materially reducing the pressure on the solution to a considerably lower pressure whereby substantially all the water and unsaponifiable material in the solution are volatilized, separating the vapors from the purified organic sulphonate salt product, compressing the vapors, preheating fresh sulphonate salt solution with the vapors whereby substantial proportions thereof are condensed.

6. The process of purifying petroleum sulphonates which comprises preheating a solution of a petroleum sulphonate salt containing non-sulphonated petroleum material to partially vaporize said solution at an elevated pressure, directly contacting the partially vaporized solution with superheated steam of a considerably higher temperature than that of the solution, and substantially immediately rapidly and materially reducing the pressure on the solution whereby non-sulphonated petroleum material in the solution is volatilized.

ROBERT BANGS COLGATE.
ROBERT LOUIS BRANDT.
HAROLD DWAINE ALLEN.